United States Patent
Hui et al.

(10) Patent No.: US 8,964,762 B2
(45) Date of Patent: *Feb. 24, 2015

(54) TIMING RE-SYNCHRONIZATION WITH REDUCED COMMUNICATION ENERGY IN FREQUENCY HOPPING COMMUNICATION NETWORKS

(71) Applicant: Cisco Technology, Inc., San Jose, CA (US)

(72) Inventors: Jonathan W. Hui, Belmont, CA (US); Lik Chuen Alec Woo, Union City, CA (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/067,274

(22) Filed: Nov. 20, 2013

(65) Prior Publication Data
US 2014/0064172 A1 Mar. 6, 2014

Related U.S. Application Data

(63) Continuation of application No. 13/180,908, filed on Jul. 12, 2011, now Pat. No. 8,619,789.

(51) Int. Cl.
*H04L 12/28* (2006.01)
*H04B 1/00* (2006.01)
(Continued)

(52) U.S. Cl.
CPC ......... *H04W 52/0209* (2013.01); *H04B 1/7156* (2013.01); *H04W 56/00* (2013.01)
USPC ...... 370/395.62; 370/436; 370/458; 370/459; 370/478; 370/508; 370/512; 370/516; 375/132; 375/134

(58) Field of Classification Search
USPC ............ 370/395.62, 436, 458, 459, 478, 508, 370/509, 512, 516; 375/132, 134
See application file for complete search history.

(56) References Cited

U.S. PATENT DOCUMENTS 6,473,412 B1 * 10/2002 Haartsen ........................ 370/331
7,164,651 B2 1/2007 Weste et al.
(Continued)

OTHER PUBLICATIONS

"RPL: IPv6 Routing Protocol for Low Power and Lossy Networks" <draft-ietf-roll-rpl-19> by Winter, at al. (Mar. 13, 2011 version).
(Continued)

*Primary Examiner* — Benjamin H Elliott, IV
(74) *Attorney, Agent, or Firm* — Parker Ibrahim & Berg LLC; James M. Behmke; Stephen D. LeBarron

(57) ABSTRACT

In one embodiment, a battery-operated communication device "quick-samples" a frequency hopping sequence at a periodic rate corresponding to a substantially low duty cycle, and is discovered by (e.g., attached to) a main-powered communication device. During a scheduled sample, the main-powered communication device transmits a control packet to be received by the battery-operated communication device, the control packet containing timing information and transmitted to account for worst-case clock drift error between the two devices. The battery-operated communication device responds to the control packet with a link-layer acknowledgment containing timing information from the battery-operated communication device. Accordingly, the two devices may re-synchronize their timing based on the timing information in the control packet and acknowledgment, respectively.

25 Claims, 13 Drawing Sheets

(51) Int. Cl.
*H04W 52/02* (2009.01)
*H04B 1/7156* (2011.01)
*H04W 56/00* (2009.01)

(56) References Cited

U.S. PATENT DOCUMENTS

| | | |
|---|---|---|
| 7,233,588 B1 | 6/2007 | Stratigakis |
| 7,457,620 B2 | 11/2008 | Lam et al. |
| 7,505,450 B2 | 3/2009 | Castagnoli |
| 7,660,405 B2 | 2/2010 | Jain et al. |
| 7,835,319 B2 | 11/2010 | Sugar |
| 7,899,027 B2 | 3/2011 | Castagnoli et al. |
| 2006/0215583 A1 | 9/2006 | Castagnoli |
| 2009/0073870 A1 | 3/2009 | Haartsen et al. |
| 2011/0176464 A1 | 7/2011 | Warner et al. |
| 2011/0316747 A1 | 12/2011 | Budianu et al. |
| 2012/0106518 A1 | 5/2012 | Albert et al. |
| 2013/0016757 A1 | 1/2013 | Hui et al. |

OTHER PUBLICATIONS

"IP is Dead, Long Live IP for Wireless Sensor Networks"; Hui et al; SenSys '08 Proceedings of the 6th ACM conference on Embedded network sensor systems; Nov. 4-7, 2008.

\* cited by examiner

SHARED SEQUENCES
400

RESPECTIVE SEQUENCES
400

TIMING RE-SYNCHRONIZATION WITH REDUCED COMMUNICATION ENERGY IN FREQUENCY HOPPING COMMUNICATION NETWORKS

CROSS REFERENCE TO RELATED APPLICATION

This application is a continuation of U.S. patent application Ser. No. 13/180,908, filed Jul. 12, 2011, now allowed, the entire contents of which are herein incorporated by this reference.

TECHNICAL FIELD

The present disclosure relates generally to wireless communication, and, more particularly, to timing re-synchronization and power consumption in frequency hopping wireless networks.

BACKGROUND

Mesh networks are composed of two or more electronic devices each containing at least one transceiver. The electronic devices use their transceivers to communicate with one another and/or a central device. If the device wishes to communicate with another device that is out of transmission range, the device may communicate via multi-hop communication through other devices. Because the devices may rely on a small source of stored energy (e.g., batteries or a capacitor), it is desirable for those devices to reduce power. In particular, the transceiver, when placed in receive mode, can require significant power and quickly drain a small source of stored energy.

In the advanced metering infrastructure (AMI) market, for example, there are a class of devices (e.g., water and gas meters) that must operate for many years on modest energy capacity (e.g., batteries). Given the power draw of existing transceivers and limited capacity of cost-effective energy storage, such devices must operate their transceivers with a very low average duty cycle.

A challenge with channel hopping at very low duty cycles is managing the time synchronization error. In particular, uncertainties in time synchronization normally occur due to clock drift, and such uncertainties are problematic in channel-hopping networks since nodes must be configured to the same channel at the same time. Maintaining tight time synchronization requires nodes to communicate timing information relatively frequently, compromising the lifetime or cost of the device's energy storage.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4C illustrate example frequency hopping sequences.

DESCRIPTION OF EXAMPLE EMBODIMENTS

Overview

Figure 1:
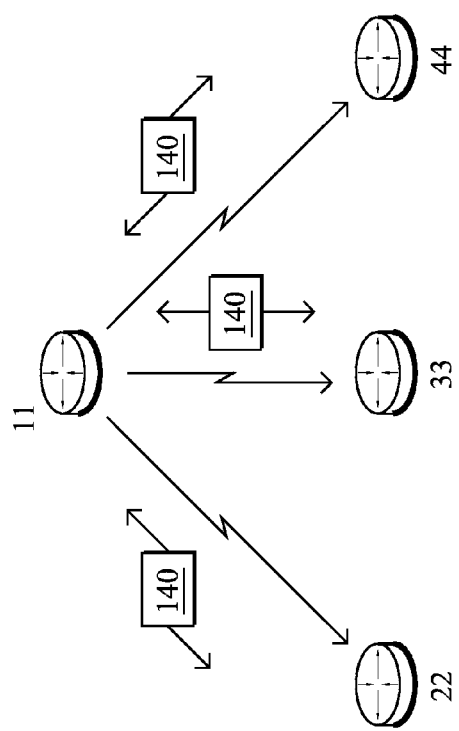
FIG. 1 illustrates an example wireless network.
Figure 1:
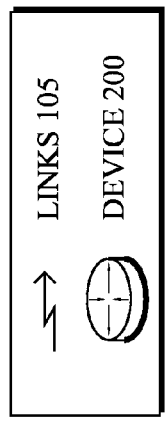

According to one or more embodiments of the disclosure, a battery-operated communication device "quick-samples" a frequency hopping sequence at a periodic rate corresponding to a substantially low duty cycle, and is discovered by (e.g., attached to) a main-powered communication device. During a scheduled sample, the main-powered communication device transmits a control packet to be received by the battery-operated communication device, the control packet containing timing information and transmitted to account for worst-case clock drift error between the two devices. The battery-operated communication device responds to the control packet with a link-layer acknowledgment containing timing information from the battery-operated communication device. Accordingly, the two devices may re-synchronize their timing based on the timing information in the control packet and acknowledgment, respectively.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example (and vastly simplified) computer network 100 (e.g., wireless or otherwise) illustratively comprising nodes/devices 200 (e.g., labeled as shown, "11," "22," "33," and "44") interconnected by frequency-hopping communication links 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices 11-44 may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate (e.g., PLC). As described herein, the communication may be based on a frequency-hopping protocol. In this context, a protocol consists of a set of rules defining how the nodes interact with each other.

Figure 2:
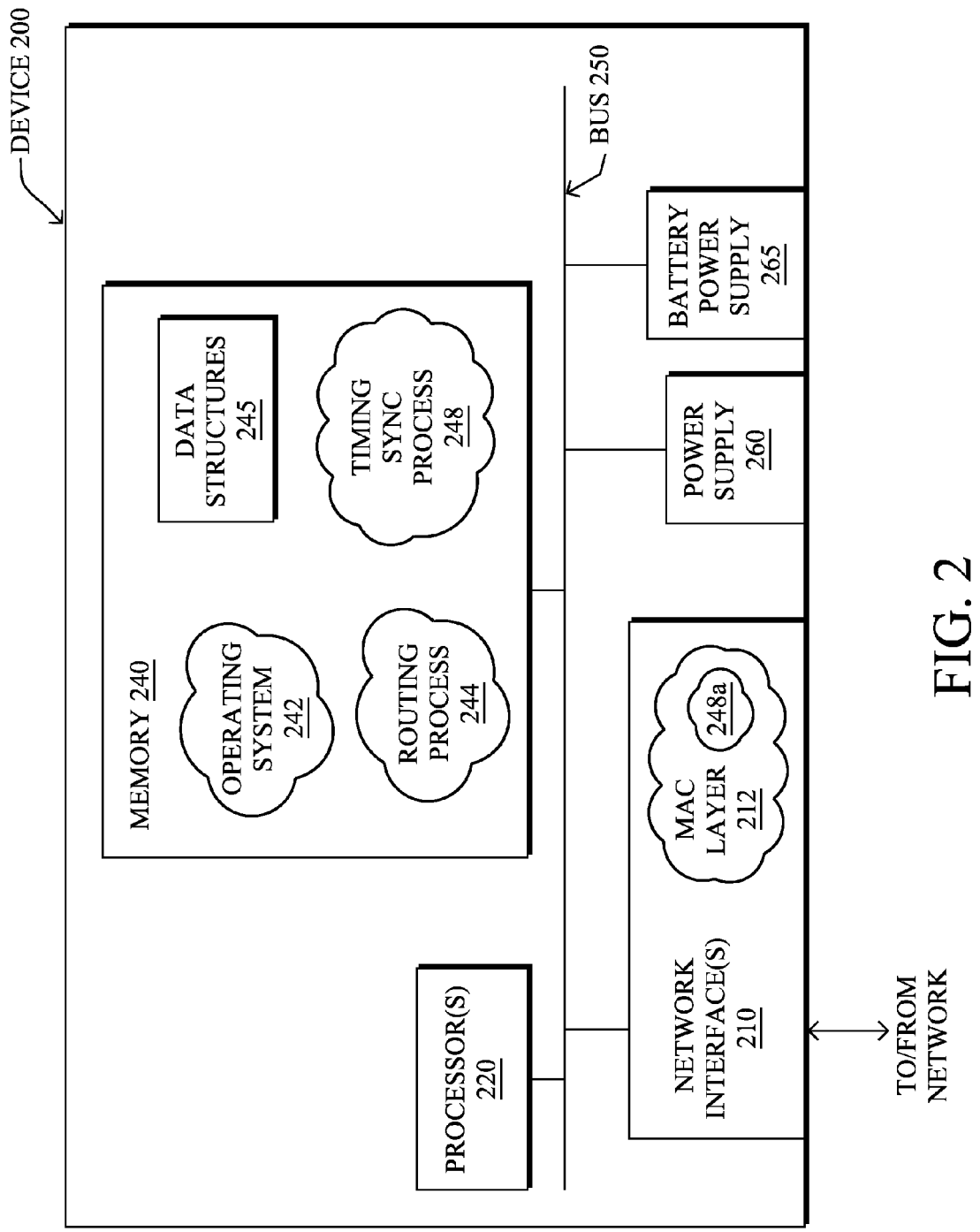
FIG. 2 illustrates an example wireless device/node.

FIG. 2 is a schematic block diagram of an example node/device 200 that may be used with one or more embodiments described herein, e.g., as nodes 11-44. The device may comprise one or more network interfaces 210 (e.g., wireless/frequency-hopping), at least one processor 220, and a memory 240 interconnected by a system bus 250, as well as a main power supply 260 (e.g., plug-in) on certain devices and a battery power supply 265 (battery, capacitor, etc.) on other devices (or in combination as a backup power supply).

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art, particularly for frequency-hopping communication as described herein. In addition, the interfaces 210 may comprise an illustrative media access control (MAC) layer module 212 (and other layers, such as the physical or "PHY" layer, as will be understood by those skilled in the art). Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative "timing synchronization" process 248 as described in greater detail below. Note that while timing synchronization process 248 is shown in centralized memory 240, alternative embodiments provide for the mode selection process to be specifically operated within the network interfaces 210, such as a component of MAC layer 212 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN)

and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rp1-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Figure 3:
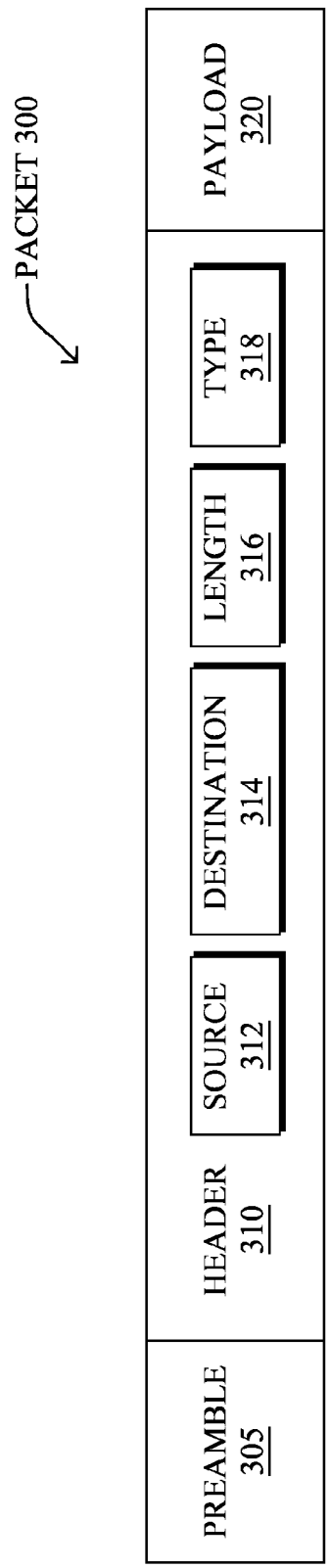
FIG. 3 illustrates an example wireless message/packet.

FIG. 3 illustrates an example simplified message/packet format 300 that may be used to communicate information between devices 200 in the network. For example, message 300 illustratively comprises a header 310 with one or more fields such as a source address 312, a destination address 314, a length field 316, a type field 318, as well as other fields, such as Cyclic Redundancy Check (CRC) error-detecting code to ensure that the header information has been received uncorrupted, as will be appreciated by those skilled in the art. Within the body/payload 320 of the message may be any information to be transmitted, such as user data, control-plane data, etc. In addition, based on certain wireless communication protocols, a preamble 305 may precede the message 300 in order to allow receiving devices to acquire the transmitted message, and synchronize to it, accordingly.

Frequency-hopping, also referred to as "frequency-hopping spread spectrum" (FHSS) or channel-hopping, is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 4A:
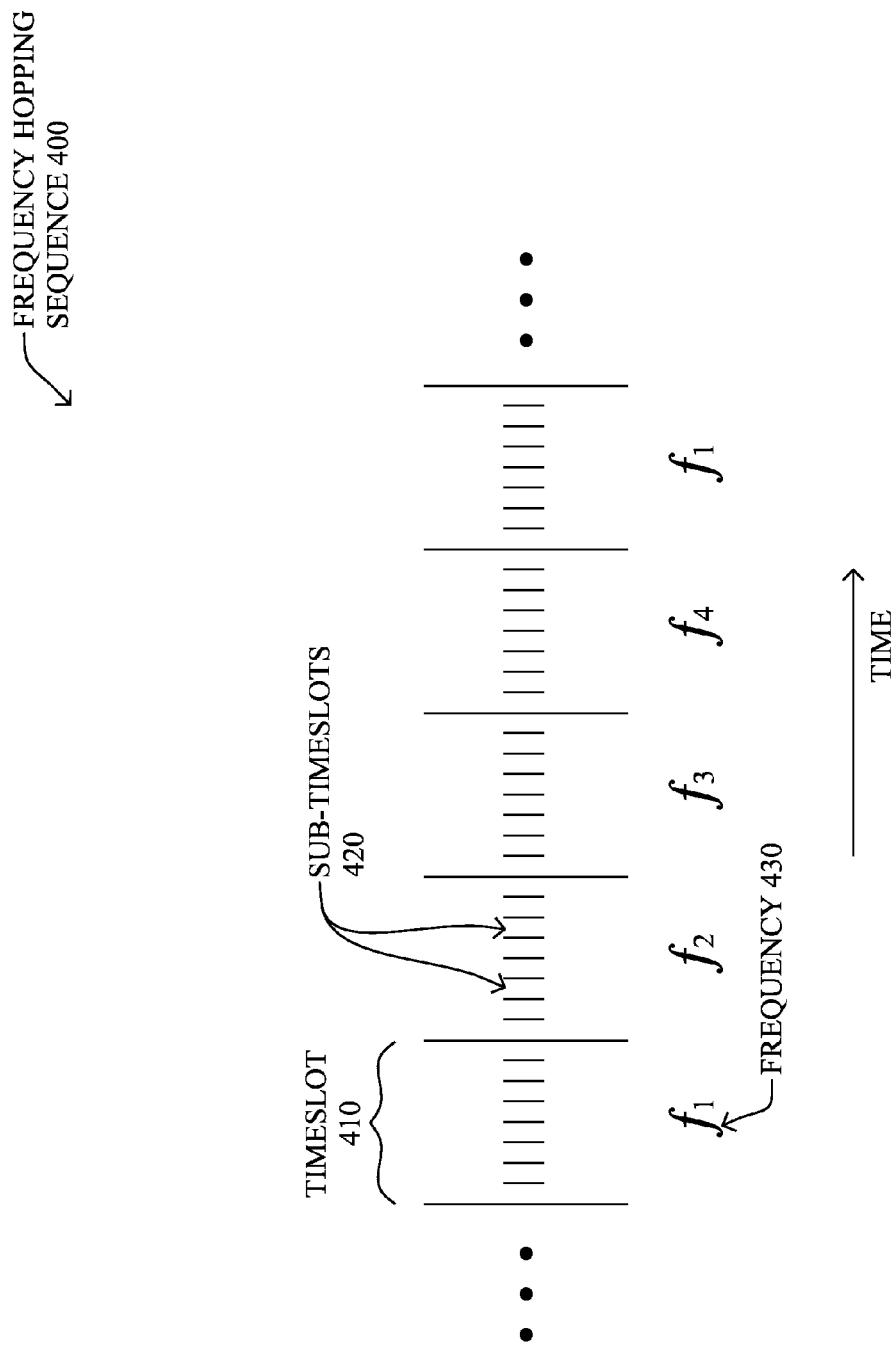

In particular, as shown in FIG. 4A, in frequency-hopping wireless networks, time frames are divided within a frequency-hopping sequence 400 into regular timeslots 410, each one operating on a different frequency 430 (e.g., $f_1$-$f_4$). A reference clock may be provided for the time frames for an entire network (e.g., mesh/cell), or at least between pairs of communicating devices. A MAC layer 212 of each node 200 divides time into timeslots that are aligned with the timeslot boundary of its neighbor. Also, each timeslot 410 may be further divided into sub-timeslots 420. (Note that not all frequency-hopping systems use sub-timeslots, and devices can begin transmission at any time within a timeslot; the view herein is merely one example.) Illustratively, the MAC layer 212 is in charge of scheduling the timeslot in which a packet is sent, the main objective of which generally being randomization of the transmission time in order to avoid collisions with neighbors' packets. Note that the MAC layer 212 must not only schedule the data messages coming from upper layers of a protocol stack, but it also must schedule its own packets (e.g., acknowledgements, requests, beacons, etc.).

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel. An example of this is shown in FIG. 4B, in which each receiver (22, 33, and 44) are all configured with the same sequence (assume also that node 11 uses the same sequence).

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick their own hopping schedule parameters independent of any other node, as is shown in FIG. 4C. Note that the offset of the frequencies (i.e., the fact that the same four frequencies are used in the same order, just offset by one timeslot) is merely one illustration, and the sequences and frequencies can be independently chosen. Also, note that while timeslots are shown as being synchronized between different nodes, those skilled in the art will appreciate that timeslots between different nodes can, in fact, be out-of-phase, and may have no relationship with each other.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

As noted above, because devices in a computer network (e.g., mesh network) may rely on a small source of stored energy (e.g., batteries or a capacitor), it is desirable for those devices to reduce power. In particular, the transceiver, when placed in receive mode, can require significant power and quickly drain a small source of stored energy. In the advanced metering infrastructure (AMI) market, for example, there are a class of devices (e.g., water and gas meters) that must operate for many years on modest energy capacity (e.g., batteries). Given the power draw of existing transceivers and limited capacity of cost-effective energy storage, such devices must operate their transceivers with a very low average duty cycle. In many cases, the duty cycle must be much less than 0.1%.

In some situations, low-latency communication to the gas and water meters may be required for emergency shutoff or demand-response applications. However, most gas and water meters today maximize lifetime by sleeping for hours at a time (typically 8 to 24 hours at a time), waking after each sleep period to poll the server for any activity and then going back to sleep. While such a system is useful for basic metering reports from the meters to a central server, communication from server to gas and water meters incurs high latency since it must wait for the device's next scheduled wake up and poll the server for data.

In addition, uncertainties in time synchronization normally occur due to clock drift. Such uncertainties are problematic in frequency hopping networks since nodes must be configured to the same channel at the same time. While some techniques may be used to reduce physical clock drift (e.g., temperature compensation and clock slewing), there will always be some difference in the time synchronization between nodes. In general, the average error in time synchronization grows linearly with the time duration between such exchanges of timing information.

A challenge with channel/frequency hopping at very low duty cycles is managing the time synchronization error. Maintaining tight time synchronization requires nodes to communicate timing information relatively frequently. Alternatively a transmitter can estimate the worst-case error and lengthen its transmission to account for the error. Both solutions to dealing with clock drift are not ideal because they consume extra energy on the battery powered device. An alternate solution is to use relatively large time slots such that the worst-case error is fully contained within a single slot. Devices need only avoid communication within the potential error window. However, such a solution is not desirable since it reduces frequency agility.

Existing systems maintain time synchronization between two devices by periodically communicating timing information. Nodes are configured to understand the worst-case clock drift and the protocol is designed to account for the worst-case. In particular, nodes may avoid communication near channel switch times, often known as a 'guard window.' Note, however, that the guard window must be fully contained within a single time slot, otherwise there is uncertainty in which channel the receiver will be tuned to. As a result, allowing large errors in practice reduces the channel agility of the network.

Alternatively, as noted, systems may lengthen their transmission duration to be as long as the worst-case error. This may be in the form of repeating the packet transmission several times back-to-back or lengthening the preamble in a channel-sampling system. However, such a mechanism is not energy efficient for the transmitter, nor is it efficient with regard to channel utilization.

Furthermore, many current systems support a notion of 'sleeping edge devices,' which turn their transceiver off for relatively long durations (e.g., minutes-hours) then periodically wake up and communicate with a nearby node to maintain time synchronization and/or network maintenance, then quickly power down. This process is initiated by the sleeping edge device, placing the burden of handling time synchronization errors on the edge device itself.

Reduced Energy Timing Re-Synchronization

The techniques described herein provide low latency communication to a battery-powered edge device, while minimizing any lifetime impact of battery-powered devices by placing the burden of dealing with time synchronization errors on the main-powered devices, rather than those with limited energy storage.

Specifically, according to one or more embodiments of the disclosure as described in greater detail below, a battery-operated communication device "quick-samples" a frequency hopping sequence at a periodic rate corresponding to a substantially low duty cycle, and is discovered by (e.g., attached to) a main-powered communication device. During a scheduled sample, the main-powered communication device transmits a control packet to be received by the battery-operated communication device, the control packet containing timing information and transmitted to account for worst-case clock drift error between the two devices. The battery-operated communication device responds to the control packet with a link-layer acknowledgment containing timing information from the battery-operated communication device. Accordingly, the two devices may re-synchronize their timing based on the timing information in the control packet and acknowledgment, respectively.

Illustratively, the techniques described herein may be performed by hardware, software, and/or firmware, such as in accordance with timing synchronization process 248 and/or MAC layer module 212 (248a), which may each contain computer executable instructions executed by a processor (e.g., processor 220 or an independent processor within the network interface 210) to perform functions relating to the novel techniques described herein, such as, e.g., as part of a frequency hopping communication protocol. For example, the techniques herein may be treated as extensions to conventional wireless communication protocols, such as the 802.11 protocol, WiFi, etc., and as such, would be processed by similar components understood in the art that execute such protocols, accordingly.

Operationally, many AMI networks consist of a connected set of main-powered devices (e.g., pole-top routers and electric meters) that can communicate wirelessly and form a mesh network. Among the powered network, however, may be a set of devices that must operate on battery power at all times. As a result, the battery powered devices need only communicate directly with main-powered devices and not other battery powered devices. Given the example in FIG. 1, assume, for illustration, that node 11 is a main-powered communication device, and that nodes 22, 33, and 44 are battery-operated communication devices. Generally, battery-powered devices in real-world AMI networks are often a single hop from main-powered devices. As such, the battery-powered devices often operate as edge devices and do not forward or route traffic from other devices.

Figure 5:
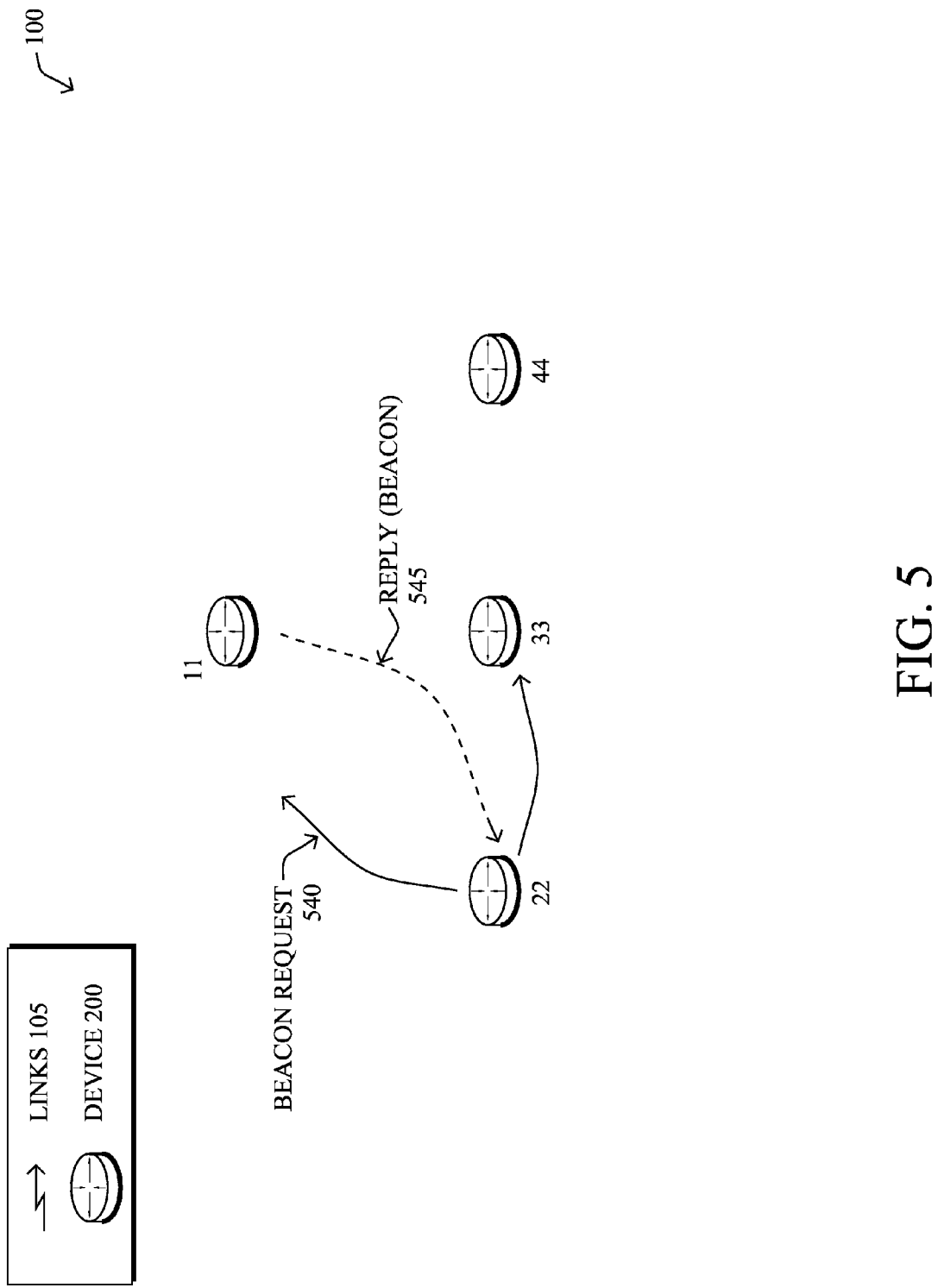
FIG. 5 illustrates an example discovery message exchange.

When starting up (e.g., "bootstrapping"), the battery-powered devices may periodically look for an appropriate network to join by sending out a beacon request and waiting for a response from a neighboring device. For example, as shown in FIG. 5, a battery-operated device 22 may send out beacon requests 540 into the network (or else may wait) to solicit a reply (beacon) 545 from and thus discover potential "attachment nodes" (e.g., DAG parents). Note that in a frequency-hopping network, the beacon request 540 may consist of transmitting a packet on all channels used within the system and thus is an energy intensive operation. As a result, the period between beacon requests may increase over time if no response is received in a timely manner.

Once one or more responses 545 are received, the battery-powered device can begin to maintain time synchronization with those discovered neighbors. In particular, the device will select some subset of those neighbors to act as "attachment routers." That is, an attachment is established between the battery-operated communication device and one or more particular main-powered communication devices. (Note that when a plurality of main-powered devices are attached, the battery-operated device may re-synchronizes timing with each of them, e.g., independently or in combination where all devices are on the same schedule.) As an illustrative example, the selection may be driven by the use of a mesh routing protocol such as RPL to optimize a path given some set of metrics. In RPL terminology, those selected subset of neighbors are equivalent to the DAG parents, and the battery-powered device is a child node. However, other criteria may be used to select the appropriate subset of neighbors. Note that given the selected neighbor subset, the battery-powered device may indicate to those neighbors that they have been selected as the attachment routers for the joining device.

In accordance with one or more embodiments herein, the battery-powered device may operate using very short receive checks. In particular, battery-operated communication devices may utilize what is termed herein as a power-reducing mode or "quick-sampling" technique. According to this mode/technique, the receiver 210 of a battery-operated device is enabled according to a low duty cycle, having a periodic occurrence of quick samples based on the schedule of a frequency hopping sequence.

In particular, to reduce power, the battery-operated devices utilize a sampling technique that is applied to the same hopping schedule 400 as used by other devices in the network. Specifically, each "quick-sample" occurs during only a particular specified sub-timeslot 420, e.g., at the beginning of a timeslot 410, using the channel/frequency assigned to the timeslot. When no transmission energy is detected during the specified sub-timeslot, the device disables (turns off) the receiver for the remainder of the timeslot.

Figure 6A:
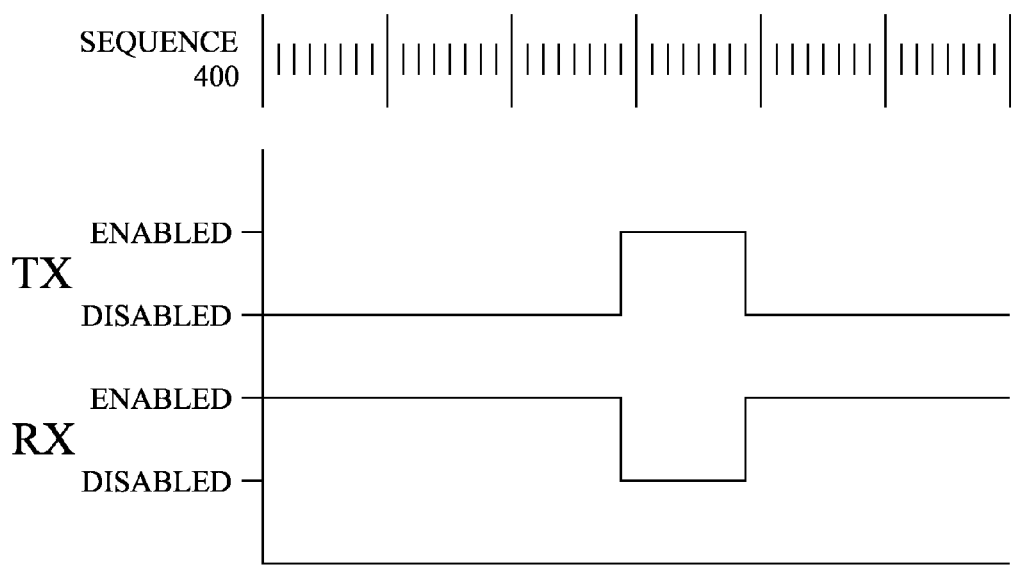
FIGS. 6A-7B illustrate examples of receiver operation.
Figure 6B:
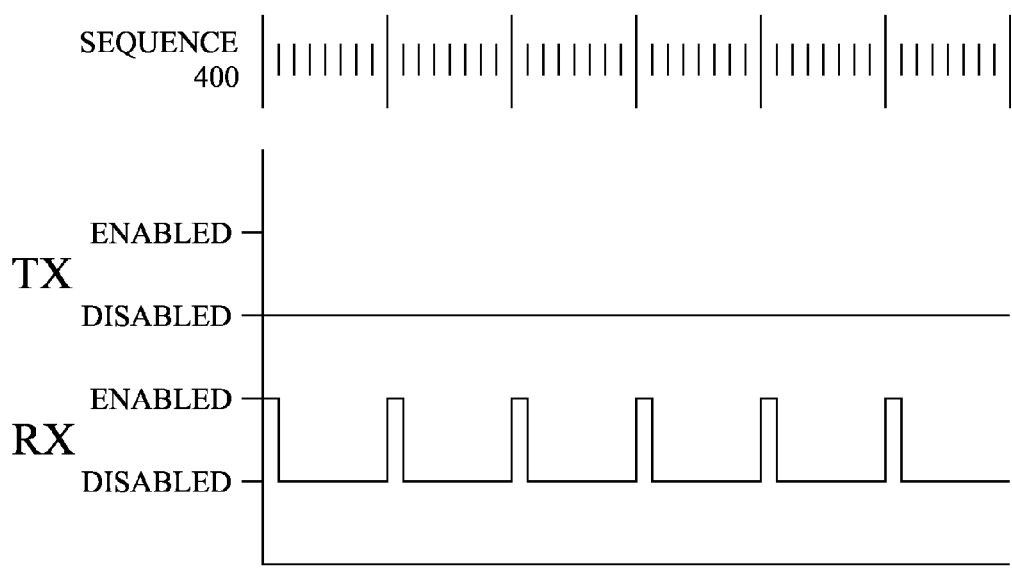

FIGS. 6A and 6B illustrate the differences between a conventional mode (FIG. 6A) and power-reduction mode (FIG. 6B), where the graphs demonstrate example receiver-enabled timing corresponding to each mode. As can be seen, the receiver is enabled nearly all the time during the conventional mode (unless transmitting), which may be the mode used by main-powered devices such as node 11. Conversely, while in power-reduction mode, the receiver is only enabled for a very small percentage of the frequency hopping sequence. FIG. 6B, notably, illustrates the instance where no transmission energy is detected during the sampling periods. Note that while the period shown is a first sub-timeslot of each timeslot, even more sparse receiver schedules may be used, such as one sample per an entire frequency hopping sequence 400, or any variation in between. The essence of the embodiments herein is that the battery-operated devices function with a reduced time frame in which transmissions may be received.

Figure 7A:
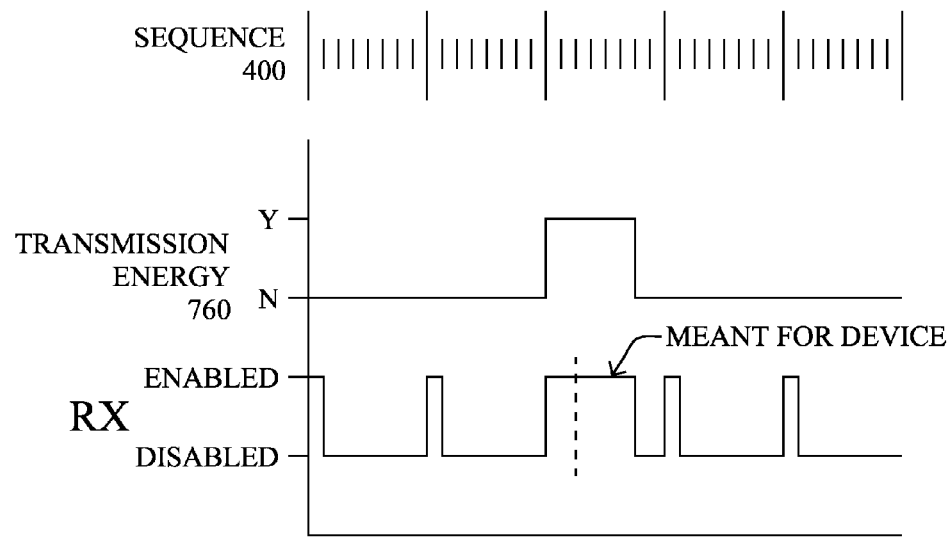

If there is transmission energy detected during a sample, then the receiving device continues to sample the channel for at least one or more sub-timeslots of the remainder of the timeslot. In particular, the receiver may remain active long enough to determine whether the transmission energy is a transmission (message/packet 140) meant for the communication device. For example, FIG. 7A illustrates the occurrence of a transmission energy 760, and the receiver remains enabled. From the receiving node's perspective, when a header 310 of a packet 300 is received, notably before the whole packet needs to have been received, the node (e.g., its MAC layer 212) analyzes the destination address 314 or other indication to determine whether the receiving node is the intended recipient of the packet 300. Illustratively, this analysis may occur after performing an error check on the header of the packet to ensure that the information is error free.

Figure 7B:
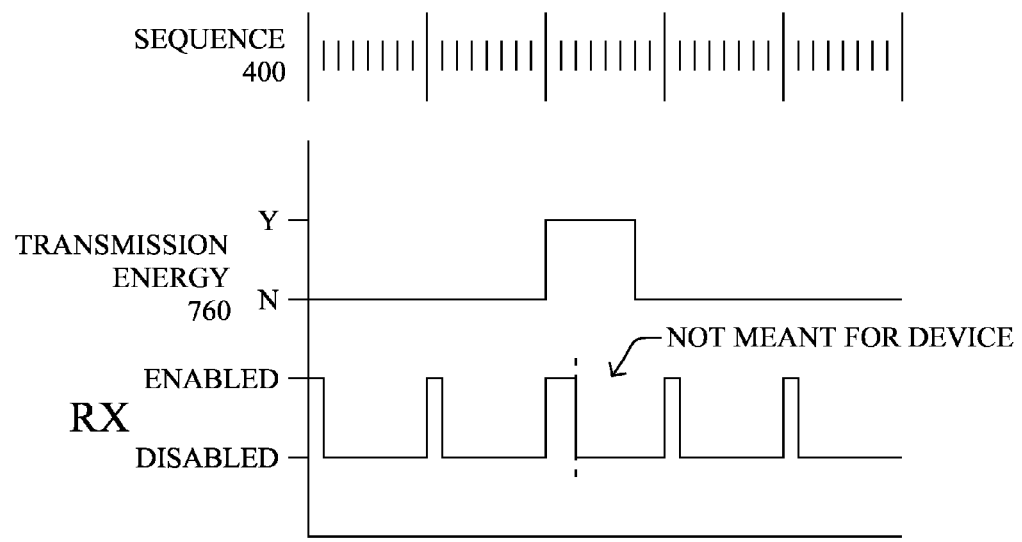

As shown in FIG. 7A, in response to verifying that the receiving node is, in fact, the intended recipient node (e.g., that the destination address corresponds to the wireless node), then the receiver may remain enabled (be kept on) for the duration of the transmission (e.g., based on length field 314, or for the duration of a standard packet, or for the remainder of the timeslot, etc.). Otherwise, if it is determined that the destination address corresponds to another wireless node, i.e., that the transmission is not meant for the communication device, then the receiver may turn off and ignore the remainder of the packet (e.g., payload 320), as shown in FIG. 7B.

Based on this power-reduction mode or quick-sampling mode, battery-operated communication devices can achieve substantially low duty cycles. For instance, a channel sample period of 400 us is achievable on existing hardware. As a result, duty cycles of less than 0.1% is possible with a 500 ms check period. Duty cycles of less than 0.01% is possible with a 5 second check period. On existing hardware (e.g., according to IEEE 802.15.4), a duty-cycle of 0.01% is sufficient for 10 years lifetime on modest batteries.

Attachment routers of battery-powered devices are responsible for initiating time synchronization exchanges with the battery-powered devices. That is, after first discovering the low duty cycle, periodic, "quick-sample" schedule of a corresponding battery-operated communication device (e.g., based on an individual exchange of information, or else based on common knowledge within the frequency hopping communication network), an attachment router may periodically transmit a control packet containing timing information to a battery-powered device.

Figure 8:
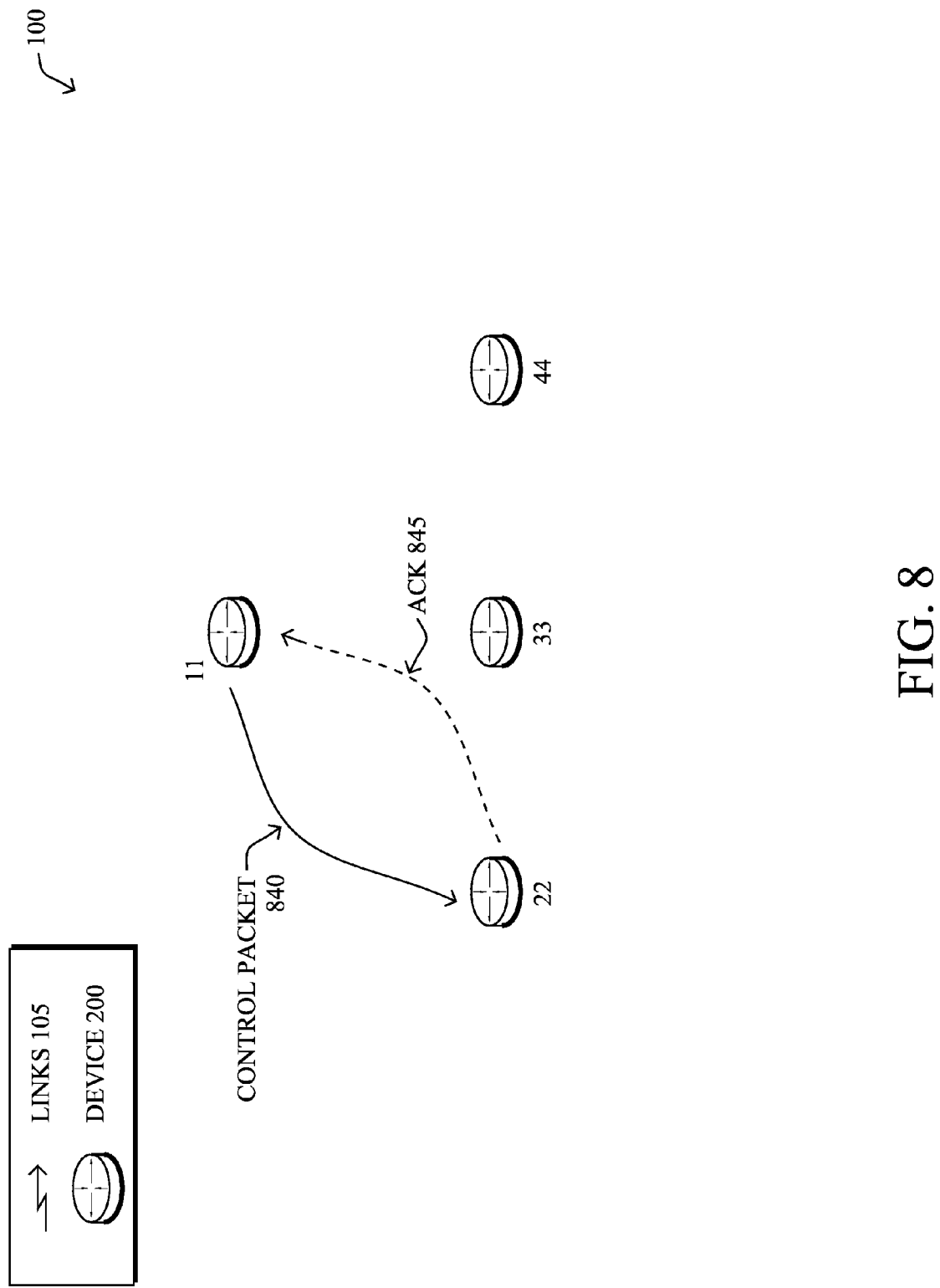
FIG. 8 illustrates an example timing message exchange.

For example, FIG. 8 illustrates an example exchange of a control packet 840 from the main-powered communication device (node 11) to a battery-operated communication device (node 22) in accordance with the techniques herein. The control packet 840 is transmitted during a scheduled sample with the timing information, and upon receiving the control packet, the battery-operated device responds with a corresponding link-layer acknowledgment ("ACK") 845 to the main-powered communication device. Contained with in the ACK 845 is another set of timing information from the battery-operated communication device. The main-powered communication device receives the ACK, and because timing information is provided in both directions, a single control-acknowledgment exchange is sufficient to re-synchronize time between the two devices. In particular, the battery-operated device can re-synchronize timing between the devices based on the timing information in the control packet 840, and the main-powered communication device can re-synchronize its timing with the battery-operated communication device based on the timing information in the acknowledgment 845. (Illustratively, packet 840 and ACK 845 may be embodied as a packet 300, and timing information may be illustratively contained within the preamble 305, or else the payload 320, as may be appreciated by those skilled in the art.)

Because the attachment router (main-powered device) is illustratively initiating the transmissions, it is responsible for increasing its transmission duration to account for the worst-case clock drift error between the battery-operated communication device and the main-powered communication device. In particular, the battery-powered device is not burdened with extending its quick-sample receive window as shown above. Note also that the battery-powered device need not lengthen its transmission for the returned acknowledgement, since the main-powered device is expecting the transmission immediately following the control packet 840 (particularly where the main-powered device's receiver are always enabled, but also where the device's receiver is duty cycled as well).

Figure 9A:
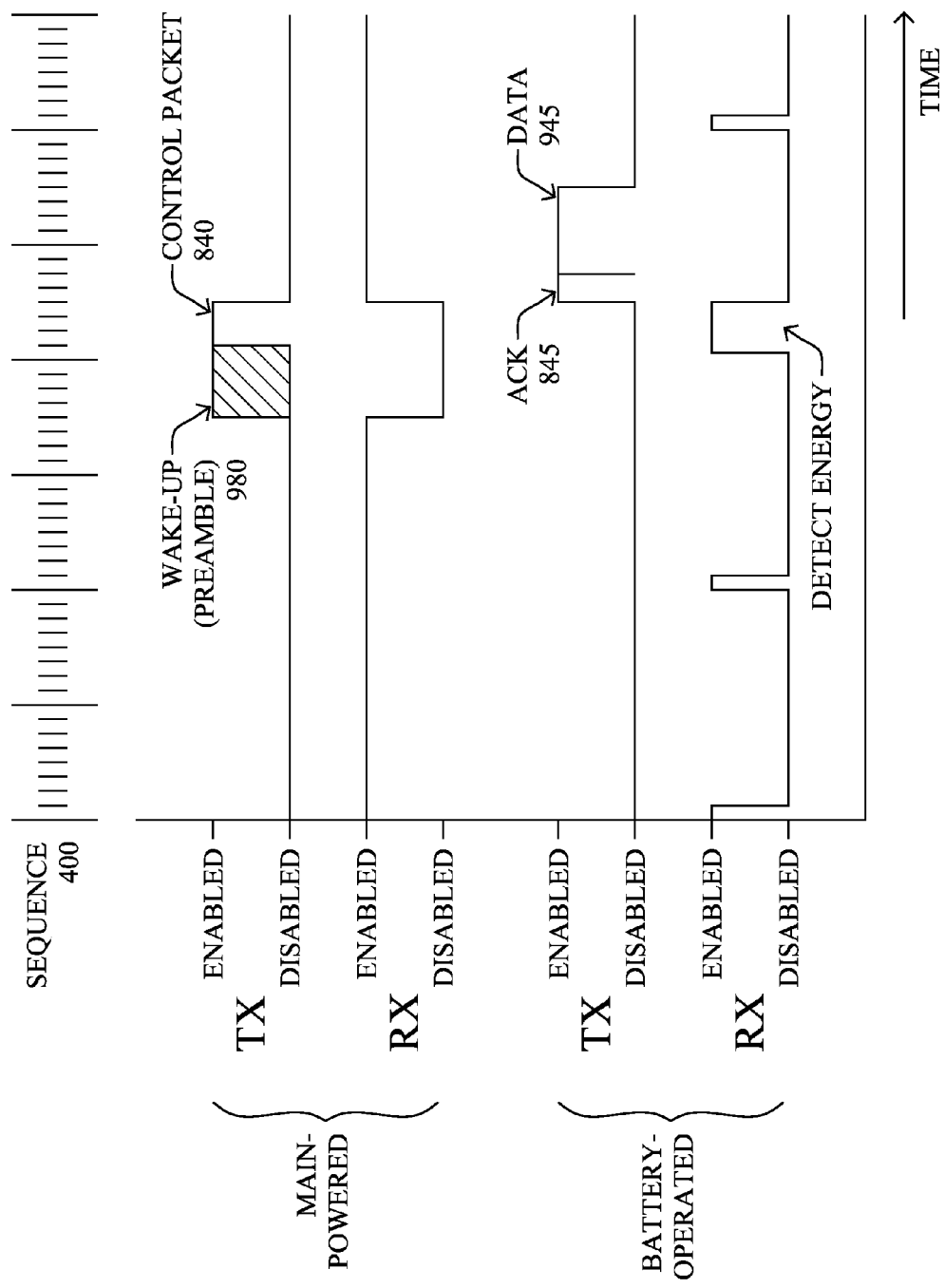
FIGS. 9A-9B illustrate another example of timing message exchange.

FIG. 9A illustrates an example timing diagram of transmitter and receiver enablement in accordance with the techniques herein. In particular, the transmission to the battery-operated node (operating in a power-reduction mode) must ensure that it is actively energized during the particular quick-sampled sub-timeslot in order for the receiver to detect the transmission based on worst-case clock drift. For instance, as shown in FIG. 9A, one or more "wake-up messages" 980 (or else simply an extended preamble 305) may precede the actual transmission 760 in order to account for any possible clock-drift of the intended receiver. Because time is synchronized, the preamble is sized to account only for the expected error in time synchronization (e.g., clock-drift) between the transmitter and receiver. The ACK 845 is also shown immediately after receiving (and processing) the incoming message at the battery-operated device. Note that the wakeup packet may contain information about when the transmitter will begin the data packet transmission. Accordingly, the receiver can disable its transceiver between receiving a wakeup packet and the expected data transmission.

Notably, due to regulatory restrictions (e.g., from the Federal Communication Commission or FCC), transmissions are limited to 0.4 s/20 s. As such, the preamble plus data transmission duration must be limited to no more than 0.4 s. In order to maintain synchronization to within +−0.2 s on +/−20 ppm crystal accuracy, a time synchronization exchange should occur at least once every 1.38 hours. According to the techniques herein, therefore, an illustrative embodiment transmits the control packets 840 at a periodic rate to ensure that the worst-case clock drift is not more than can be accounted for in an allowed transmission time (e.g., less than 0.4 s) based on a corresponding communication protocol (e.g., FCC regulation). Using simple clock drift estimation and temperature compensation in software, however, the required communication period can be extended by an order of magnitude.

According to a specific embodiment herein, the battery-powered device may optionally indicate in the acknowledgment 845 that it has data packets enqueued for forwarding, and will transmit those messages immediately following the transmitted acknowledgement. For instance, as also shown in FIG. 9A, the enqueued data 945 may be transmitted immediately after the ACK 845, or else very shortly thereafter, and received by the main-powered device.

Figure 9B:
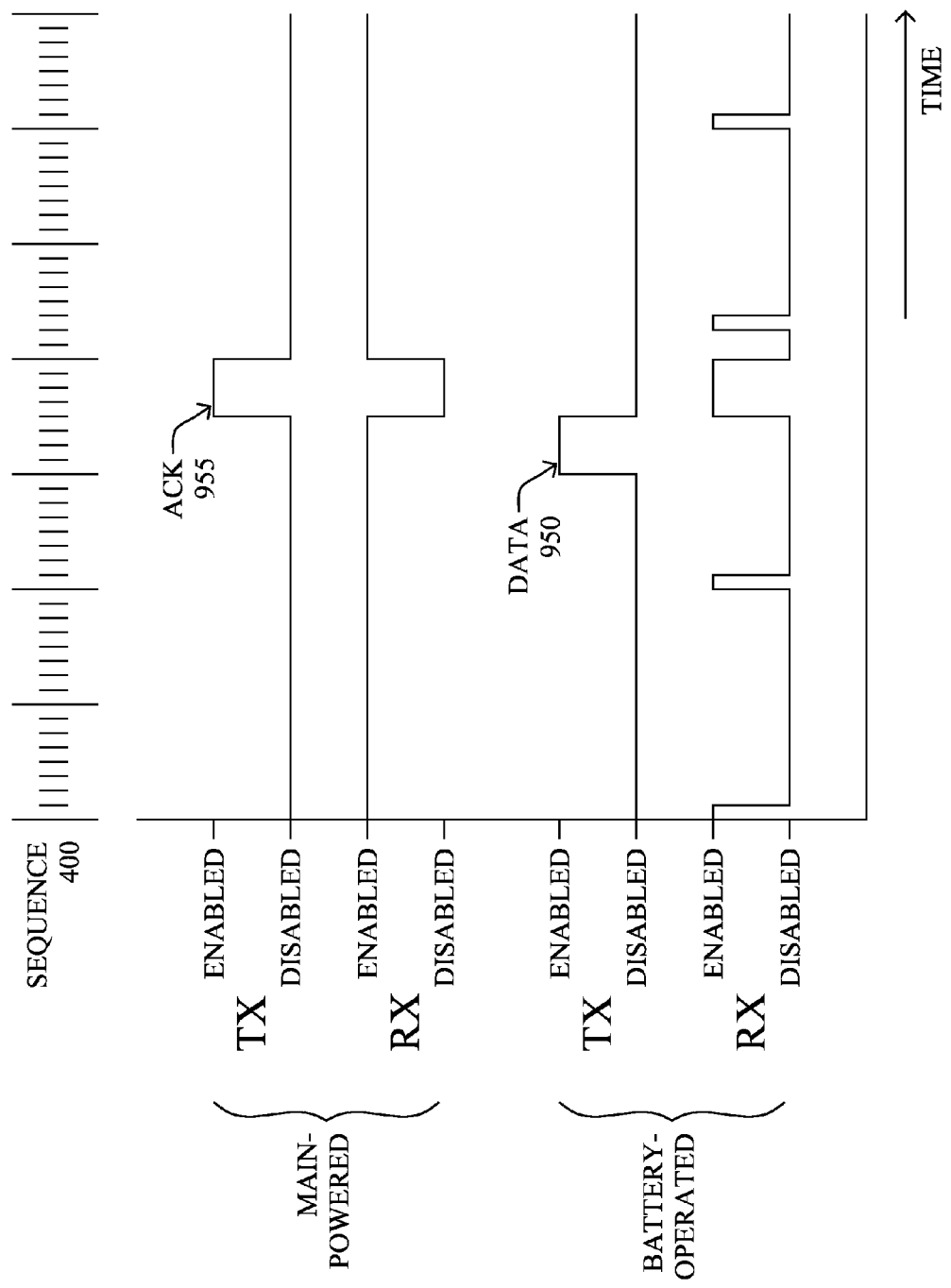

According to another specific embodiment, a battery-powered device may alternatively (or in addition) choose to take on the burden of time synchronization errors for selected traffic, such as critical data. As shown in FIG. 9B, for example, urgent messages 950 may be sent without waiting for a time synchronization message from the attachment router. In particular, upon determining that the battery-operated communication device has critical data for transmission, the critical data may be transmitted without waiting for a subsequent control packet from the main-powered communication device, where the transmission accounts for worst-case clock drift error between the devices. (As also shown, an ACK 955 may be returned by the main-powered device, and as such, the battery-operated device may enable its receiver in anticipating of the ACK, accordingly.)

Notably, if a battery-operated devices does not receive the resynchronization control packet within some amount of time greater than the expected resynchronization period, the battery-operated device may "detach" from the router. Furthermore, if a battery-operated devices has detached from its last router, it may return to a mode to search for new attachment routers.

Figure 10:
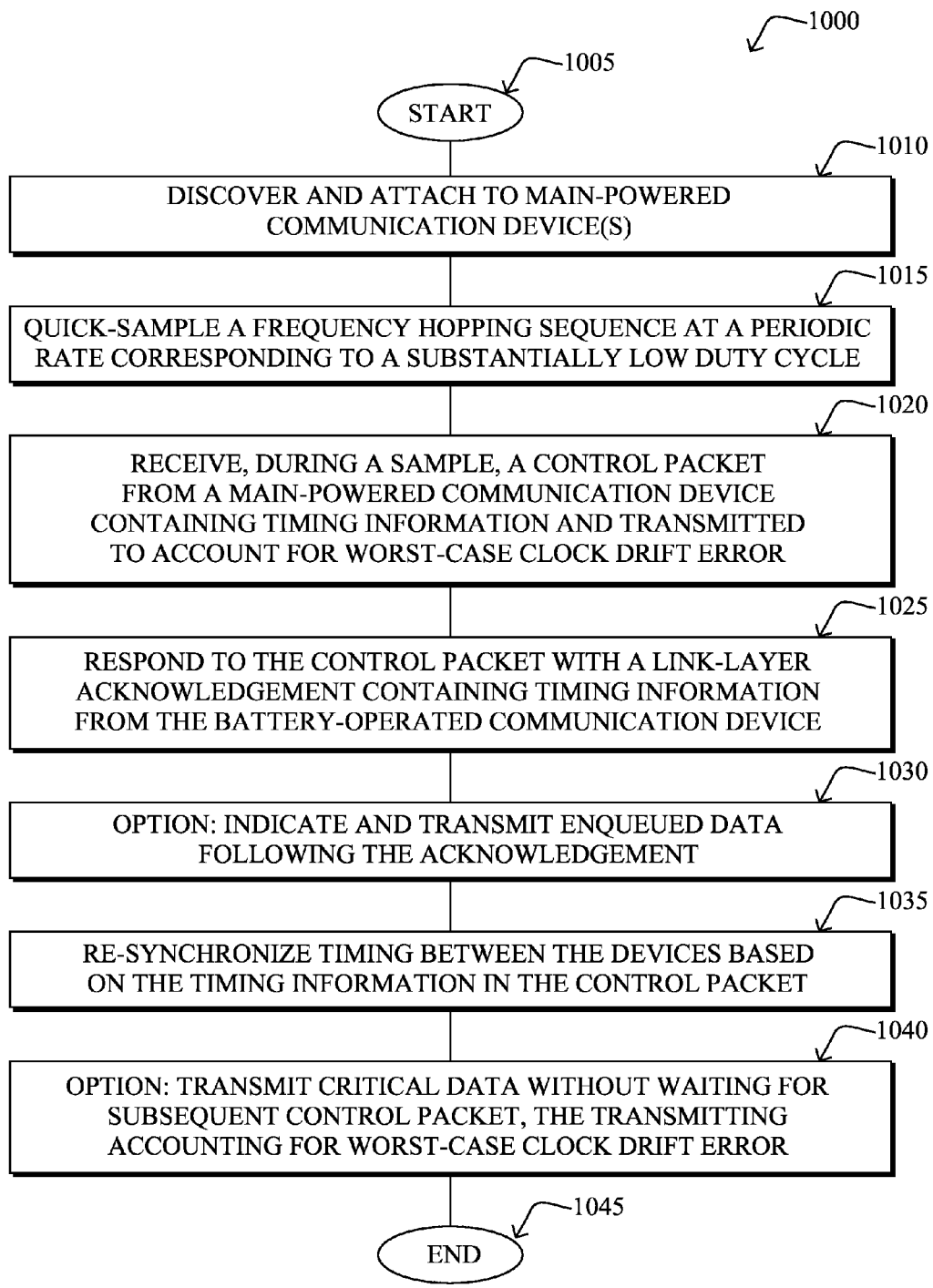
FIG. 10 illustrates an example simplified procedure for timing re-synchronization with reduced communication energy in frequency hopping computer networks, e.g., from the perspective of a battery-operated communication device.

FIG. 10 illustrates an example simplified procedure for timing re-synchronization with reduced communication energy in frequency hopping computer networks in accordance with one or more embodiments described herein, e.g., from the perspective of a battery-operated communication device. The procedure 1000 starts at step 1005, and continues to step 1010, where a battery-operated communication device, e.g., node 22, discovers and attaches to one or more main-powered communication devices, e.g., node 11. In general, in step 1015, the battery-operated device "quick-samples" a frequency hopping sequence at a periodic rate corresponding to a substantially low duty cycle, as described in greater detail above.

At some occasional point, in step 1020, during a sample period, the battery-operated device receives a control packet 840 from the main-powered communication device containing timing information and transmitted to account for worst-case clock drift error, as described above. In step 1025, the receiving battery-operated device responds to the control packet with a link-layer acknowledgment 845 containing timing information from the battery-operated communication device. Optionally, as mentioned above, in step 1030 enqueued data may be transmitted following the acknowledgment (and as indicated in the acknowledgment).

Based on the timing information in the control packet, in step 1035 the battery-operated device may re-synchronize itself with the selected main-powered communication device. Note that optionally in step 1040, critical data may be transmitted from the battery-operated device without waiting for a subsequent control packet, in which case the transmitting accounts for worst-case clock drift error. The procedure 1000 ends in step 1045 notably with the ability to return to step 1010 to discover new attachment nodes (particularly in response to not receiving the resynchronization control packet within some amount of time greater than the expected resynchronization period, as mentioned above), and/or to step 1020 to receive control packets from nodes already attached.

Figure 11:
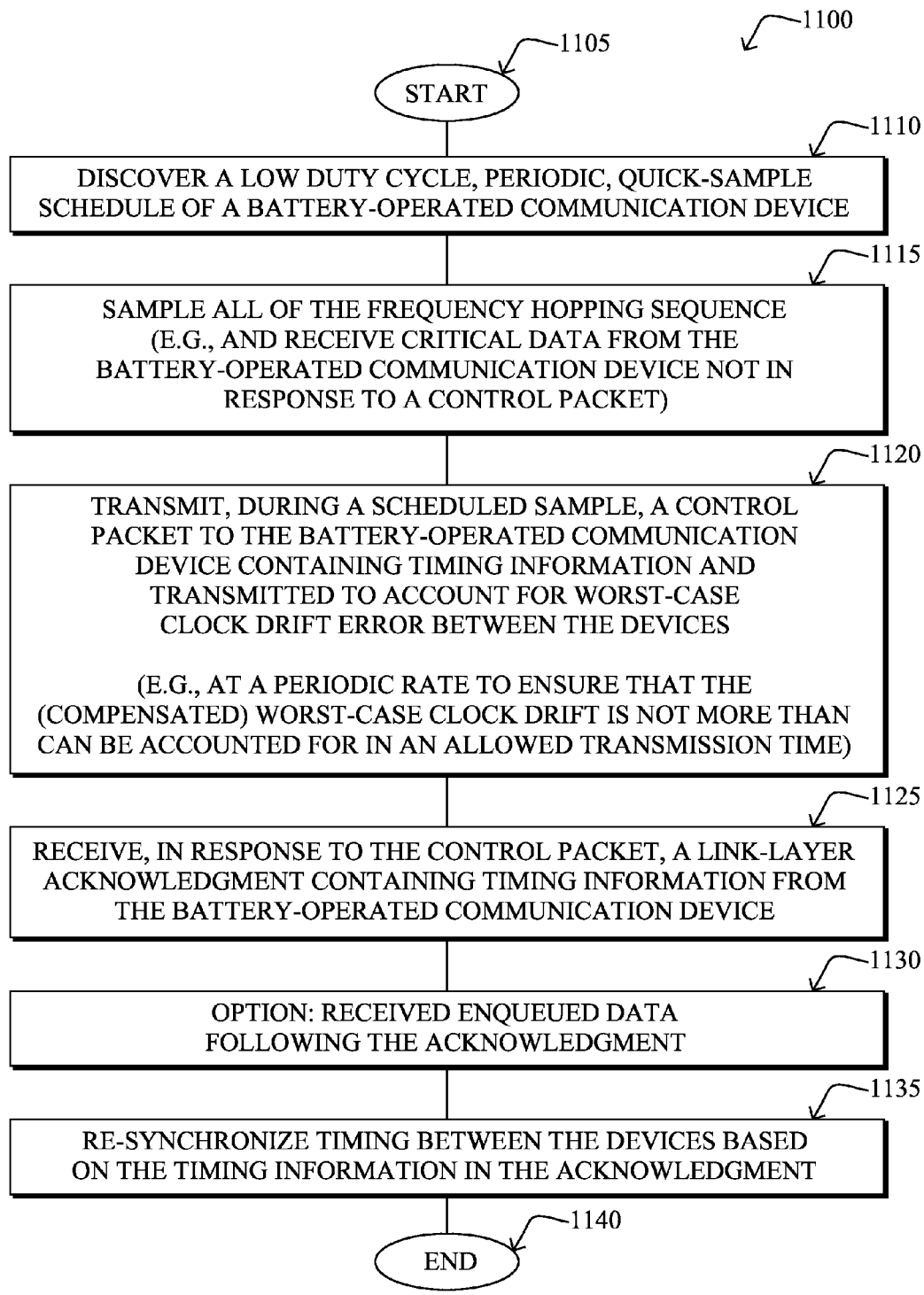
FIG. 11 illustrates another example simplified procedure for timing re-synchronization with reduced communication energy in frequency hopping computer networks, e.g., from the perspective of a main-powered communication device.

In addition, FIG. 11 illustrates an example simplified procedure for timing re-synchronization with reduced communication energy in frequency hopping computer networks in accordance with one or more embodiments described herein, e.g., from the perspective of a main-powered communication device. The procedure 1100 starts at step 1105, and continues to step 1110, where the main-powered communication device, e.g., node 11, discovers a low duty cycle, periodic, quick-sample schedule of a battery-operated communication device, e.g., of node 22, as described in greater detail above. Notably, in step 1115 (and in general), the main-powered communication device may sample all of the frequency hopping sequence 400, and optionally may receive critical data from the battery-operated communication device not in response to a control packet, as described herein.

Occasionally, in step 1120, the main-powered communication device may transmit a control packet 840 during a scheduled sample to the battery-operated communication device containing timing information and transmitted to account for worst-case clock drift error between the devices, as detailed above. For instance, according to one or more embodiments herein, the transmission's occasional rate is a periodic rate to ensure that the worst-case clock drift is not more than can be accounted for in an allowed transmission time (e.g., FCC regulation). As noted, various compensations, such as clock drift estimations and temperature-based computations may allow that rate to be extended somewhat.

In response to the control packet, in step 1125 the main-powered communication device may receive a link-layer acknowledgment 845 containing timing information from the battery-operated communication device. (Optionally, in step 1130, enqueued data following the acknowledgment may also be received from the battery-operated device.) Based on the timing information in the acknowledgment 845, the main-powered communication device can then re-synchronize its timing with the battery-operated communication device in step 1135, and the procedure 1100 illustratively ends in step 1140 (notably, with the ability to return to steps 1110-1120 to learn of new battery-operated devices, receive unexpected transmissions, or to transmit a control packet, respectively).

It should be noted that while certain steps within procedures 1000-1100 may be optional as described above, the steps shown in FIGS. 10-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1100 are described separately, certain steps from each procedure may be incorporated into each other procedure, and the procedures are not meant to be mutually exclusive.

The novel techniques described herein, therefore, provide for timing re-synchronization with reduced communication energy in a frequency hopping network. By placing the responsibility (burden) of time synchronization error on main-powered devices, a system in accordance with the techniques herein increases energy and channel efficiency of maintaining time synchronization between a battery-powered edge device and a main-powered attachment router, while also allowing for communication of latency-tolerant data packets. Due to such increases in energy efficiency, an increase in lifetime and/or cost reduction of energy storage may be realized. For instance, reducing visits to gas and water meters (to replace batteries, for example, which should last for many years) is a major factor for utilities. Also, because the system may allow for larger time errors, the solution can utilize cheaper time crystals with lower frequency tolerance.

While there have been shown and described illustrative embodiments that provide for timing re-synchronization with reduced communication energy in a frequency hopping network, it is to be understood that various other adaptations and modifications may be made within the spirit and scope of the embodiments herein. For example, the embodiments have been shown and described herein with relation to LLNs, such as sensor networks. However, the embodiments in their broader sense are not as limited, and may, in fact, be used with other types of networks and/or protocols. Also, while the description above relates to packets and packet headers, the techniques may be equally applicable to non-packetized transmissions.

Moreover, while the techniques above are generally directed to the instance where the battery-operated communication devices are in single-hop relationships with the main-powered communication devices, the techniques may also be applied where multiple battery-operated hops are necessary to reach a main-powered device. In this instance, the battery-operated communication devices may coordinate their reduced power operational schedules in order to ensure that the transmissions of one device are heard by another device. Note that this may require greater battery usage on the "transmitting" device (accounting for clock drift, etc.), though a noticeable power reduction in the network may still be achieved based on the infrequent sample rate, without sacrificing the efficient timing re-synchronization as described above.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   sampling a frequency hopping sequence in a communication network by a battery-operated communication device at a periodic rate corresponding to a substantially low duty cycle;
   receiving, during at least one sample of the sampling, a control packet at the battery-operated communication device transmitted from a main-powered communication device, the control packet containing timing information to account for timing errors between the battery operated device and the main-powered device;
   responding to the control packet with an acknowledgment to the main-powered communication device, the acknowledgment containing timing information from the battery-operated communication device; and
   re-synchronizing timing between the battery-operated communication device and the main-powered communication device at the battery-operated communication device based on the timing information in the control packet.

2. The method as in claim 1, further comprising:
   discovering, by the battery-operated communication device, one or more main-powered communication devices; and
   establishing an attachment between the battery-operated communication device and one or more particular main-powered communication devices, wherein the battery-operated communication device re-synchronizes timing with the one or more particular main-powered communication devices.

3. The method as in claim 1, wherein the main-powered communication device is a parent node for the battery-operated communication device in a directed acyclic graph (DAG).

4. The method as in claim 1, wherein the acknowledgment contains an indication of enqueued data, the method further comprising:
   transmitting the enqueued data from the battery-operated communication device to the main-powered communication device following the acknowledgment.

5. The method as in claim 1, further comprising:
   determining that the battery-operated communication device has critical data for transmission; and
   in response, transmitting the critical data without waiting for a subsequent control packet from the main-powered communication device, the transmitting accounting for worst-case clock drift error between the battery-operated communication device and the main-powered communication device.

6. The method as in claim 1, wherein the duty cycle is less than 0.1%.

7. The method as in claim 6, wherein the duty cycle is less than 0.01%.

8. A method, comprising:
   discovering, by a main-powered communication device, a low duty cycle, periodic, sample schedule of a battery-operated communication device within a frequency hopping sequence in a communication network;
   transmitting, during a scheduled sample, a control packet from the main-powered communication device to the battery-operated communication device, the control packet containing timing information to account for timing errors between the battery operated device and the main-powered device;

receiving, in response to the control packet, an acknowledgment at the main-powered communication device, the acknowledgment containing timing information from the battery-operated communication device; and re-synchronizing timing between the battery-operated communication device and the main-powered communication device at the main-powered communication device based on the timing information in the acknowledgment.

9. The method as in claim 8, wherein the battery-operated communication device is a child node of the main-powered communication device in a directed acyclic graph (DAG).

10. The method as in claim 8, further comprising:
sampling all of the frequency hopping sequence by the main-powered communication device.

11. The method as in claim 10, further comprising:
receiving critical data from the battery-operated communication device at the main-powered communication device during the frequency hopping sequence and not in response to the control packet.

12. The method as in claim 8, further comprising:
receiving enqueued data from the battery-operated communication device at the main-powered communication device following the acknowledgment in response to the control packet.

13. The method as in claim 8, wherein the control packet is transmitted at a periodic rate to ensure that the worst-case clock drift is not more than can be accounted for in an allowed transmission time based on a corresponding communication protocol.

14. The method as in claim 13, wherein a preamble and data portion of control packet is transmitted in less than 0.4 seconds.

15. The method as in claim 13, further comprising:
determining a clock drift estimation; and
extending the periodic rate for transmitting the control packet based on the clock drift estimation.

16. The method as in claim 15, further comprising:
determining a temperature compensation for the clock drift estimation; and
extending the periodic rate for transmitting the control packet based on the clock drift estimation with the temperature compensation.

17. An apparatus, comprising:
a processor;
a battery power supply;
a transceiver configured to communicate in a communication network according to a frequency hopping sequence; and
a memory configured to store a process executable by the processor, the process when executed by the processor operable to:
sample the frequency hopping sequence at a periodic rate corresponding to a substantially low duty cycle;
receive, during at least one sample, a control packet transmitted from a main-powered communication device, the control packet containing timing information to account for timing errors between the battery operated device and the main-powered device;
respond to the control packet with an acknowledgment to the main-powered communication device, the acknowledgment containing timing information from the apparatus; and
re-synchronize timing between the apparatus and the main-powered communication device based on the timing information in the control packet.

18. The apparatus as in claim 17, wherein the process when executed is further operable to:
discover one or more main-powered communication devices; and
establish an attachment between the apparatus and one or more particular main-powered communication devices, wherein the process re-synchronizes timing with the one or more particular main-powered communication devices.

19. The apparatus as in claim 17, wherein the acknowledgment contains an indication of enqueued data, and wherein the process when executed is further operable to:
transmit the enqueued data to the main-powered communication device following the acknowledgment.

20. The apparatus as in claim 17, wherein the process when executed is further operable to:
determine that the apparatus has critical data for transmission; and
in response, transmit the critical data without waiting for a subsequent control packet from the main-powered communication device, the transmitting accounting for worst-case clock drift error between the apparatus and the main-powered communication device.

21. An apparatus, comprising:
a processor;
a main-power power supply;
a transceiver configured to communicate in a communication network according to a frequency hopping sequence; and
a memory configured to store a process executable by the processor, the process when executed by the processor operable to:
discover a low duty cycle, periodic, sample schedule of a battery-operated communication device;
transmit, during a scheduled sample, a control packet to the battery-operated communication device, the control packet containing timing information to account for timing errors between the battery operated device and the main-powered device;
receive, in response to the control packet, an acknowledgment containing timing information from the battery-operated communication device; and
re-synchronize timing between the battery-operated communication device and the apparatus based on the timing information in the acknowledgment.

22. The apparatus as in claim 21, wherein the process when executed is further operable to:
sample all of the frequency hopping sequence; and
receive critical data from the battery-operated communication device during the frequency hopping sequence and not in response to the control packet.

23. The apparatus as in claim 21, wherein the process when executed is further operable to:
receive enqueued data from the battery-operated communication device following the acknowledgment in response to the control packet.

24. The apparatus as in claim 21, wherein the control packet is transmitted at a periodic rate to ensure that the worst-case clock drift is not more than can be accounted for in an allowed transmission time based on a corresponding communication protocol.

25. The apparatus as in claim 24, wherein the process when executed is further operable to:
determine a clock drift estimation and a temperature compensation for the clock drift estimation; and extend the periodic rate for transmitting the control packet based on the clock drift estimation with the temperature compensation.

\* \* \* \* \*